United States Patent [19]
Werwitzke et al.

[11] 3,965,226
[45] June 22, 1976

[54] METHOD OF PROVIDING A THICK CONCENTRIC ENVELOPE ON AN ELECTRICAL CONDUCTOR

[75] Inventors: Lothar Werwitzke, Langenhagen; Hans-Dieter Stenzel, Hannover; Hermann Uwe Voigt, Langenhagen, all of Germany

[73] Assignee: Kabel-und Metallwerke Gutehoffnungshutte Aktiengesellschaft, Hannover, Germany

[22] Filed: Nov. 25, 1974

[21] Appl. No.: 526,459

[52] U.S. Cl. .............................. 264/25; 174/120 R; 264/27; 264/93; 264/104; 264/174; 264/235; 264/236
[51] Int. Cl.² ..................... B29C 25/00; B29F 3/10
[58] Field of Search .......... 264/174, 235, 236, 346, 264/347, 25, 27, 104, 105, 93

[56] References Cited
UNITED STATES PATENTS

| | | |
|---|---|---|
| 3,100,136 | 8/1963 | D'Ascoli et al. .................... 264/174 |
| 3,130,447 | 4/1964 | Karl et al. ........................... 264/347 |
| 3,198,868 | 8/1965 | Pedretti et al. ..................... 264/347 |
| 3,479,446 | 11/1969 | Arnaudin, Jr. et al. ............. 264/174 |
| 3,532,783 | 10/1970 | Pusey et al. ......................... 264/174 |
| 3,538,207 | 11/1970 | Toole .................................. 264/174 |
| 3,846,528 | 11/1974 | Chrisman et al. .................... 264/174 |
| 3,849,192 | 11/1974 | Schmidt ............................... 264/174 |

Primary Examiner—Robert F. White
Assistant Examiner—James B. Lowe
Attorney, Agent, or Firm—Ralf H. Siegemund

[57] ABSTRACT

Insulation is extruded onto a conductor and immediately quench-cooled to obtain solidification for retaining concentricity of conductor and envelope. The envelope is reheated under pressure to melt a surface zone, followed by gradual cooling whereby the melted zone migrates into the interior. Reheating under pressure and gradual cooling, possibly also under pressure, improves texture, and provides for a more ordered crystal structure and/or fuller crosslinking. Following extrusion, and on reheating, the cable is freely suspended and assumes catenoidal contour while advancing to avoid sliding contact of the outer surface until adequately stable solidification has taken place.

17 Claims, 3 Drawing Figures

U.S. Patent June 22, 1976 3,965,226
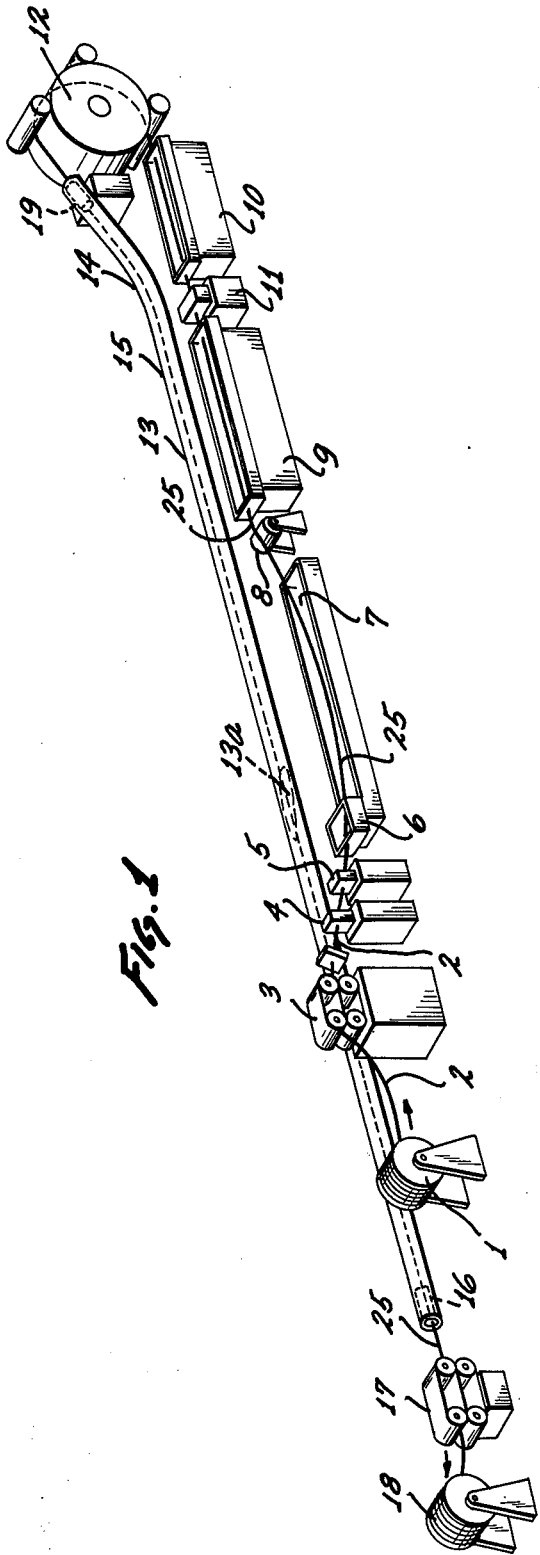

METHOD OF PROVIDING A THICK CONCENTRIC ENVELOPE ON AN ELECTRICAL CONDUCTOR

BACKGROUND OF THE INVENTION

The present invention relates to envelopes for electrical conductors and cable, and made of thermoplastic or elastomeric material, and more particularly the invention relates to the making of such thermoplastic or elastomeric envelopes for cables and conductors which will be used for conduction of higher electrical voltages. The invention will find utility for crosslinked plastic materials as well as for plastics without crosslinking, but with predominant interest for thick envelopes.

Conductors and cables are quite frequently insulated in that a thermoplastic or elastomeric material is extruded onto the conductive cable core. In some instances crosslinking of the plastic is needed simply because the electrical transmission characteristic of the cable requires that kind of insulation. Therefore, the cable has to be heated subsequently to obtain crosslinking. If the cable is to be used for high voltage, the insulation may have to be more than 10mm thick. It has not yet been possible to provide for an adequate method of enveloping a conductor with such a thick envelope and in a horizontal production line, because the insulation will flow around the conductor by force of gravity and form a drop; on a continuous basis, this amounts to an excentric displacement of the conductor in the envelope so that the wall thickness of the insulation is not only not uniform but is locally too thin.

Aside from these drawbacks as resulting from the geometry, additional problems arise pursuant to cooling, because internal strain (resulting from fast surface cooling) will inevitably produce local weak spots as far as insulative strength in concerned. An envelope which is asymmetric in cross-section must be expected to have an asymmetric stress pattern which may be result in excessive local stress on bending.

In order to avoid the aforementioned deficiencies it has been suggested to insulate high voltage cable e.g., with polyethylene in a tower like production line. The conductor to be enveloped is run up in a 50 to 60m high tower, reverses its direction, and the envelope is extruded on its down path. Crosslinking is obtained right behind the extruder in a so called vulcanizing station. The enveloped conductor then runs into a water filled pipe for cooling. Drop formation of the insulation is simply avoided by the vertical orientation of the conductor when enveloped with more or less liquidous, but also vertically oriented plastic envelope.

The problem posed by an excentrically arranged conductor in an envelope is indeed avoided by such vertical production line. However, to construct a 200 foot high tower for that purpose (and a manufacturing hall to put the tower in) is rather undesirable to say the least. Additionally, the production speed is quite limited when enveloping the conductor along a vertical line.

DESCRIPTION OF THE INVENTION

It is an object of the present invention to provide for thick insulation around a conductor, in a single layer forming process and with horizontal orientation of the conductor in the production line but under avoidance of excentric conductor dislocation in the envelope.

It is an object of the present invention to provide for thick envelopes on conductors, with or without formation of crosslinks in the curing stage.

In accordance with the preferred embodiment of the invention it is suggested to extrude a thick envelope onto and around a conductor or cable (while running basically in the horizontal) and to cool the envelope immediately thereafter in quench-cooling like fashion and for a short period only, to solidify the plastic so that its concentric geometry is basically fixed. The conductor with freshly extruded envelope dips briefly into a tank whereby the water will in effect support the insulation. The cable has sufficient strength at that point to take up some pressure without incurring surface damage or other deformation.

Subsequently, the cable is heat treated but only for a duration that causes an outer portion of the envelope to melt directly. Prior to complete softening (radially) of a heated portion of the envelope, a gradual resolidification begins, preferably also under pressure, while the zone of softening and melting migrates into the interior; gradual resolidification and cooling progresses from the outside until completed adjacent the core. Hence, following the reheating for melting outer zones, the temperature conditions are such that the outermost zone can and will solidify in a growing zone of more ordered texture while melting shifts to the inner part of the envelope followed likewise by ordered solidification. Cooling after reheating does not mean quenching down to temperatures below softening of amorphous plastic, but more or less gradual reduction of the temperature to which the envelope is exposed, bearing in mind here, that the higher ordered state has usually higher softening points.

The immediate cooling following the extrusion, and the zone-wise melting subsequently arrests and maintains respectively the conductor in a concentric disposition with respect to and inside of the envelope. Immediately following extrusion as well as during reheating the conductor with envelope traverses perferably a catenoidal like path to defer the need for physical transport and engagement until a sufficently strong shell has formed by cooling in both instances. The cable is redirected under corresponding engagement with redirecting elements only when safely possible. The conductor with envelope as leaving the extruder passes preferably straight and without surface contact into and through a first cooling tank to obtain immediately a solid outer skin or shell sufficient to permit slight deflection of the cable without squeezing. Such deflection may be needed to run the conductor through subsequent cooling tanks to obtain a sufficiently strong, nonliquidous envelope.

The reheating and subsequent cooling is preferably carried out in a tube with a catenoidal portion as reheating zone, and the envelope will engage that tube only after a sufficiently sturdy shell has formed on the outside.

If the envelope is made of crosslinking plastic, crosslinks are not formed (or very little) initially on quenching which necessitates the reheating to temperatures in which crosslinks can form. Reheating softens the outer envelope and runs the temperature up to where crosslinks are formed rather speedily. As the crosslinks grow in number, the outer zones of the envelope begin to solidify, and a high density of crosslinks results in a thermosetting plastic shell. Heat migration into the interior of the envelope still melts portions followed by crosslinking and resolidification thereat.

The formation of crosslinks and therefore, the solidification process should commence as speedily as safely possible (without decomposing the plastic) to stabilize an outer shell before the interior of the envelope begins to melt. Accordingly, one will apply a high temperature at first to establish a high temperature gradient into the outer zones of the envelope so that crosslinking networks develop and cover a rather wide zone before the innermost portion of the envelope has melted. Cooling should not begin before crosslinks have formed in adequate number, but at least an outer shell must have turned into a thermosetting plastic as the result of the crosslinking, or at least into a plastic with higher melting point before the zones near the conductor melt. Generally speaking, an outer shell of solidified plastic should form before the innermost envelope portions melt, to maintain the stable concentric relation between envelope and conductor as established during the first, fast cooling.

Plastic, for example polyethylene of the type which does not crosslink, will have poorly formed, low melting crystaline internal structure after the initial short cooling. The thermal treatment and gradual cooling changes the crystal structure into one which softens and melts at higher temperature and limits the softening and melting range under shifting of its lower limit to higher temperatures. Polyethylene structure, for example, becomes more uniform and its degree of crystalinity as well as its density is increased which improves the transmission characteristics of the cable. Also, the melting point of polyethylene with a higher degree of crystalinity is higher. Thus, after an initial more or less rapid reheating of the outer zones of the envelope, the temperature could be dropped to a value below the crystaline melting point followed by very gradual cooling to obtain slow and, therefore, ordered crystal growth, while the period of heat transfer into the envelope is extended to permit the more interior zones to melt while the outer zone begins to solidify.

Crosslinking plastics exhibit also a change in crystal structure though that is less important than in the case of non-crosslinking plastics. Except that, generally, the softening point is higher (or the polymer has become a thermosetting plastic) for the ordered-crosslinked state so that outer shell resolidification and geometry restabilization occurs already at temperatures where in the amorphous state the plastic is still soft. It should be noted here, that texture control of this type and in this manner is not or hardly possible in the known tower like, vertical production lines.

It can thus be seen, that it is essential for the invention to provide immediately for mechanical strengthening of the extruded envelope on a preliminary basis, particularly by means of limited but rapid cooling, and that is followed by reheating and controlled cooling to improve the morphological structure progressively in radial direction and under conditions whereby the cable core is continuously concentrically supported in or in relation to a concentric envelope portion that remains rigid. The initial quench-cooling has as its only purpose to permit subsequent mechanical handling under disregard of the resulting electrical properties. The subsequent reheating, heat treatment and controlled cooling is carried out on one hand for the purpose of controlled formation of the desired texture, while on the other hand, the concentricity of conductor and envelope is maintained in that specifically the outer shell of the envelope resolidifies for one reason or another before the more interior zones of the envelope melt. As a general rule, the envelope should never be allowed to melt all the way through.

In addition, care is being taken to avoid any surface damage and deformation which is the reason for partial catenoidal suspension of the cable in those phases of the process in which the envelope could be subject to surface damage unless positive steps are taken to prevent that.

Basically, it is not necessary to quench cool the freshly extruded envelope down to room temperature. Related thereto is the possibility of having the thermal treatment follow directly the initial cooling, but temporary storage of the cable is within the realm of the possibilities. If for any reason the cable becomes quite cold, preheating may be desirable (but under the softening point), followed by heating - softening under pressure for the thermal, texture improving treatment. Initial cooling may, for example, be combined with wetting the envelope with an agent that enhances crosslink formation on the subsequent thermal treatment. At some point between initial cooling and reheating, one may apply (extrude) a shield to the envelope in the form of a conductive, rapidly crosslinking plastic layer.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a schematic, perspective view of a cable production line in accordance with the preferred embodiment of the present invention; and FIGS. 2 and 3 are cross-sections through two cables as made in accordance with the invention and in different stages of the process.

Proceeding now to the detailed description of the drawings, it should be noted first that in FIG. 1 a feed drum 1 for wire provides the primary input for this production line which at first extends from drum 1 to the right of the Figure. The right hand assembly including reel 12 reverses the course of the jacketed wire, and the production line continues somewhat behind and towards the left with final take up of the completed cable 25 on a drum 18.

A conductor core or wire 2 is reeled from drum 1 and pulled particularly from this drum by means of a caterpillar capstan 3. The conductor may consist of a single core or wire or of plural stranded filamets. This conductor or conductor assembly passes through a first extruder 4 for a conductor surface finish coating, and through a second extrusion press 5 for extruding insulative plastic e.g. polyethylene. A wire cleaning device may be provided just ahead of extruder 4. The envelope or jacket as provided by the extruder 5 is a single layer of considerable thickness, 10mm or more. The plastic involved here is provided for or without crosslinking. Polyethylene is preferred.

The conductor as coated is immediately run through a cooling or quenching tank 6 to be supported therein to some extent by the water due to buoyancy. The press 5 extrudes and feeds right into that small tank 6. Extrusion is carried out without counter or back pressure being applied to the envelope on the cable. Buoyancy of the plastic in water prevents or, at least, impedes formation of drops or other run off. Particularly, the upper plastic is supported against gravity and will not flow from the upper portions of the just formed envelope, around the wire core to the lower portions.

Following the small quenching tank 6 there is provided a rather long cooling trough 7, also filled with water. The two water containers 6 and 7 cool the cable down to 85°C even as low as 60°C, but cooling is provided for only a short period as the conductor cable traverses these tanks 6, 7 quite fast.

The duration of cooling is not intentionally kept short as far as cooling per se is concerned, but the main point here is that the cooling path for the conductor is provided in such a manner that no support engaging the surface of the initially quite soft envelope is required. The conductor assumes a catenoidal contour, i.e., sags as a whole to some extent and thereby dips into the cooling tank 7. The plastic is buoyantly supported while passing through the water in tank 7.

Cooling in tank 7 suffices to form a self-supporting skin on the surface of the insulation, the remainder of the envelope still being liquidous when the conductor leaves tank or trough 7. The solidified skin supports this plastic-liquidous interior of the envelope, and particularly, the formed rigid skin prevents formation of drops; the still viscous plastic underneath the skin will not flow from upper portions (i.e., from above the conductor core) to lower portions.

The jacketed conductor when leaving tank 7 has an envelope which is at least sufficiently strong that it can be deflected slightly through engagement with a pulley 8 without being squeezed. Pulley 8 directs the cable for passage through additional cooling tanks 9 and 10. The conductor may be cooled down in these tanks to environmental temperature which is the most simple manner of proceeding. However, cooling to such low temperatures may not be necessary. The main point is, that the envelope following the cooling is sufficiently solidified, and strong so that it can be reeled, wound on drums or otherwise handled without loss of the concentricity between core and insulative envelope. Thus, the envelope should be cooled below the softening point of the plastic throughout. More is not necessary because the cable will be heat treated shortly thereafter.

If the plastic is of the type that is to crosslink, one or the other of the tanks may include a medium that promotes crosslinking and which wets the surface of the envelope on cooling. Crosslinking of polyethylene is enhanced for example by peroxides. Peroxides diffuse rather rapidly into extruded polyethylene.

The application of a crosslink formation promoting agent may occur in a tank having position more downstream in the production line, and if for example, further cooling is no longer desired at that point, the tank may be warm and the cable may pass subsequently through an infrared water to promote diffusion, but insufficient to melt the plastic.

Another extruder 11 may be interposed between tanks 9 and 10 to provide, for example, a coating on top of the envelope as a radiation shield, which is particularly desirable if the cable is to be used for high voltages in excess of 110 kilo-volts.

The material applied here as a shield may include a plastic which forms crosslinks rather rapidly, and includes electrically conductive components to obtain some but low electric conductivity and having higher density than the envelope underneath. Since the surface of the envelope is quite cool at this point, this additional layer is not welded onto the envelope but is more or less sintered thereon. If the bond is not too firm, end stripping of the conductor becomes easier, for example, for preparing such a cable for fastening to a connector or the like.

The additional layer as extruded by press 11 cools in the second tank 10 together with the envelope underneath. Moreover, the subsequent heat treatment followed by cooling to be described shortly will be carried out with the additional layer in place so that this radiation shield is well in place on the cable, without formation of any cavities or voids between it and the envelope. Such voids could lead to local arcing.

The two tanks 9 and 10 may have similar temperatures, but if the extruder 11 is actually present it may be necessary to provide a somewhat different temperature in tank 10 to take the newly extruded outer layer into consideration. Also, as stated above, one of these tanks may serve merely as application for an agent enhancing crosslinking.

The conductor as withdrawn from tank 10 is now mechanically strong, but does not have adequate characteristics for transmission of electrical signals, particularly high voltages. In other words, the geometry of the resulting cable is quite perfect, and the conductor position is stabilized in concentric relation to the envelope, particularly with regard to uniformity in the insulation thickness. However, the insulation is by and larger rather poorly crystalized at that point nor have crosslinks been formed, at least not to the desired extent. The envelope does not constitute a satisfactory insulation particularly regarding high voltages at this point. Therefore, the insulation must be improved in this respect and here particularly by means of heat treatment which, however, does not impair the stable and favorable geometry as attained thus far. This heat treatment may follow later, but it is practical and economonical to have it follow immediately the stabilizing process as described, particularly because the cable may still be warm, particularly in its interior.

The heat treatment under pressure is necessary for example, if the desired insulation properties are based on adequate crosslinking, but crosslinks in the plastic have not yet formed to the extent necessary as the first part of the process was devoted primarily to the rapid stabilization of the geometry. However, heat treatment is also necessary for insulation which does not form crosslinks. The initial quench like cooling to say 85°C in water tanks 6, 7 resulted in a very poorly crystalized stabilizing shell or skin. Moreover, the insulation will exhibit pores, cavities, voids, astabile crystals, particularly in the surface near regions.

The interior of the envelope cools slower and results in a better ordered crystalization or even some crosslinking, with gradual deterioration in texture in radial outward direction. Therefore, the heat treatment now needed will involve primarily surface near zones but could involve also zones near the conductor if that is necessary. In actuality this is a matter of degree.

In any event, the cable and conductor as enveloped is sufficiently strong when leaving tank 10 so that it can now, for example be redirected (see pulley 12) to enter a heat treatment station 13. The heat treatment station provides, basically, for controlled reheating of the envelope under pressure and more or less gradual cooling to room temperature.

This redirecting reel, drum or pulley 12 is preferably not an idler but is driven, and its speed is preferably controlled in dependance upon the operating speed of the wire pulling device 3. Moreover, another pulling device, such as a caterpillar capstan 17, is provided at the end of this particular production line pulling the cable out of the station 13, and reel 12 should also be controlled in dependance upon the speed of the latter. The devices 3 and 17 should also be speed controlled in relation to each other so as to avoid undue tension in the system. Speed differences could change the slack in tank 7 and elsewhere; such change if permitted would change the rate of cooling at this critical point which is undesirable.

The station 13 is basically of tubular construction with a first portion 14 of catenoidal configuration following the contour of the cable as freely hanging and being suspended following running off the drum or reel 12. The catenoidal tube 14 is continued in a straight tube 15 having a slightly, but noticeable inclination in the horizontal. This way, it can be avoided that the envelope engages the wall of tube 14/15 except, maybe in lower portions downstream of and in tube 15.

The condition as basically established here provides for a two point reeling support of the cable as passing through the thermal treatment station 13. One point is the run off point at pulley 12, the other point of support is established by caterpillar capstan 17. The cable is not unsupported inbetween but will slide over the surface of tube 15 but well downstream of catenoidal section 14 and when having attained sufficiently strong surface. The length of portion 14 is about one tenth of the distance between the external support points in the front of and behind station 13.

Heating of the envelope takes place in section 14 if one assumes (which is in effect a worst case condition) that the cable is completely cold when entering the station 13, but one still will need a catenoidal portion 14 of a few meters only. The cable 25 can contact the wall downstream in tube 15 without scoring or formation of any other surface defects in the insulation. If, however, the cable is still quite warm, or preheated, e.g. by infrared radiation, heating in station 13 will require less time, and the effective length of the cable 25 that must not be in sliding contact with any surface is shorter accordingly.

The heat treatment is carried out under pressure of up to 17 to 19 atmospheres and at a temperature ranging from 100°C to 280°C for different types of plastic and depending on the purpose of the heat treatment. The station 13 includes the tubes 14/15 through which the wire passes and can be considered to be a closed system. The entrance and exit openings of the tube assembly 14/15 may be closed by rubber seals.

The tube 14/15 will contain e.g. steam at the desired temperature and pressure to obtain the necessary heat treatment and heat transfer into the envelope of the passing cable. Reference numeral 13a denotes a (horizontal) surface level of water contained in the lower part of the tube 15 of station 13. This level 13a may be subject to control so as to control the relative duration of water vs. steam treatment within the closed system. Also, cold water vs. hot water treatment can be controlled in the same manner. This depends on the type of plastic employed as envelope.

Since the heat treating station operates as a closed fluid system (however, in conjunction with external heating and cooling sources to maintain particular conditions and temperature gradient in the fluid temperature along the entire path of the wire in tubes 14, 15) the surface level temperature of water at 13a may be about the same as that of the steam above the level so that the temperature as applied is gradually reduced underneath level 13a. The change from heating to cooling is, therefore, not an abrupt one. Decisive is that an outer shell of the envelope has already solidified, either because of crosslinking or because of crystal growth, before the innermost portion of the envelope has melted.

It should be noted that for the different types of polymers (crosslinking vs. thermoplastic) one could use different equipment. However, the same equipment 14/15 is actually useable, subject to different temperature control. Where crosslinking is to be obtained, heating lasts longer and the steam has a higher temperature. Cooling below the softening point the polymer had prior to crosslinking can occur rather rapidly after the crosslinked zone has grown to significant dept. Within the context of this invention, cooling may also mean reduction in temperature even though the temperature is still above the softening point of still linear and/or amorphous plastic. If crosslinks are not to be formed, the heating path is shorter and cooling must be considerably more gradual as following cessation of heat application above the melting point, to obtain slow crystal growth as deeply as possible into the envelope. The total length of heating plus cooling is about the same for either type of treatment.

The water level as well as its temperature may be subject to control, whereby for example, different feed and discharge paths are provided to obtain e.g. hot water under surface level 13a and cold water at or near the lefthand end of the tube 13. The same is true as far as pressure of the water is concerned. The wire with envelope will pass into and out of the tube 14, 15 through pressure locks and seals. However, inbetween locks may be provided in addition, and if necessary to operate with different pressures in the various portions of tubes 14 and 15 in station 13. The important and common aspect is that the cable with envelope is subjected to steam heating in the catenoidal portion (14) of the station under free suspension, followed by gradual cooling to obtain a radially inwardly migrating melted zone in the envelope and a slow, ordered solidification process.

The main functions, purpose and operation of the thermal treatment station shall be described next. For example, the plastic may be of the type that does not form crosslinks and heat treatment in station 13 serves to cause texture changes of the outer layer portions of the envelope as far as degree of crystalinity is concerned.

The plastic envelope may have been cooled in assembly 6, 7, 9, 10 by water of 85°C temperature, resulting in a sufficiently rigid outer sleeve for some mechanical handling but with poor crystal structure and including particularly voids, instable cyrstals and other defects. The zones of the envelope closer to the conductor core cooled slower and their crystal state is somewhat better. The heat treatment in station 13 changes the texture of the envelope to establish a high voltage resisting insulation.

The steam or hot water treatment under pressure heats the envelope (e.e., polyethylene) at 100° to 120°C so that the outer zone melts. This temperature, however, is below the melting point for highly crystaline polyethlylene, so that crystal growth in the outer shell and resolidification occurs quite early. The pressure is about 15 atmospheres.

To speed up the process, infrared heating of the outer zone may be provided for to obtain rapid melting of the immediate surface of the envelope followed by crystal growth beginning lower steam temperature while heat transfer into the envelope softens tube surface zones of poor crystal structure. Heating occurs in the zone of free suspension, i.e., in the catenoid pipe 14, at least until the outer shell has adequately solidified. Subsequently, the envelope is gradually cooled in warm, later in cold water along pipe 15. The temperature control of the heating/cooling process is such, that a solidified crystaline shell has formed before the interior of the envelope melts. The zone near the conductor of a 300mm² copper conductor of a 10mm thick envelope is, therefore, heated to about 110 centigrade for about 1 minute followed by gradual reduction of the temperature which drops below the softening point after less than 10 minutes for the same wire speed. The medium temperature of the water at 13a is about 90°C, and by the time the external temperature drops below the softening point of low-crystaline plastic e.g. polyethylene, the deepest point of the melting zone in the envelope has a distance from the conductor by about 10% of the total thickness of the envelope.

The molten envelope recrystalizes slowly resulting in a much higher degree of order and that in turn establishes improved electrically insulative properties in the envelope. Compacting pressure in the heating zone but also in the cooling zone improves ordered crystal growth and avoids formation of voids and cavities in the envelope. About two-thirds of the total envelope should be heated so as to avoid internal stress in the rather thick envelope. This about covers the zone or originally very poor crystal structure.

If the envelope material is of the type which is to form crosslinks, initial rapid cooling following extrustion resulted in little or no crosslinking. Now, station 13 runs the envelope up to crosslinking temperature, in excess of 200°C, and suitable pressure is applied accordingly. Heating occurs also here primarily in the catenoidal tube 14. The effective temperature gradient is to be quite steep so that the outer, crosslinking envelope is rather wide and any inner, merely soft zone should be quite small. This is absolutely essential because, for example, polyethylene is quite soft at 150°C, but crosslinking speed at that temperature is quite low. That speed about doubles for each 10° centigrade temperature increase. On the other hand, the heat transport depends to some degree on the temperature gradient, so that for a differential of 200°C one can generate a rather narrow melting zone, bearing in mind that cross-linking requires about 200° to 280°C at a reasonable speed.

Therefore, one will heat the surface near zones by means of steam and under pressure to a high temperature such as 280° which results in a steep internal gradient, producing speedy crosslinking and resolidification of an outer shell. The core - near zones of the envelope should stay hard for continued support and maintaining concentricity until the outer shell is sufficiently strong. Only then will the melted zone migrate inwardly. This is in fact obtained on high heating of a 10mm thick polyethylene envelope up to 280°C, and for a period of 17 atmospheres pressure, followed by gradual reduction of the tmeperature to room temperature at or near the end of tube 15.

Please note here, that heating will not change abruptly to cooling, but following the heating there may result a temperature stabilization for obtaining solidification of an outer shell in which crosslinks have been formed at a high density. This restabilizes the outer geometry while melting and crosslink forming continues in the more inner zone.

Crosslinking speed can be increased if an infrared heating device is provided in the upper portion of pipe 14 to raise the surface temperature of the envelope to about 250°C, independantly from the 17 atmospheres pressure. This way, one can alleviate sealing problems in the tubular wire guide arrangement.

It can be seen that the crystal structure particularly in zones near the conductor and particularly for large conductor cross-sections, can be improved if the conductor and the adjacent zones of the envelope are heated, e.g., through electrical current through the conductor or external resistance heating to 60° to 100°C. This procedure may be necessary if heat loss towards the outside is too great to permit melting of the inner envelope portion when the outer shell is already cooled in tube 15. By preheating the interior closer to the softening point, remelting and slow resolidification can readily be obtained even if the outer shell is already cooled.

FIGS. 2 and 3 demonstrate two different phases for polyethylene cable on the basis of crosslinking the polymer.

FIG. 2 shows a cross-section through the cable inside of station 13, after about 1 minute of reheating under steam of above 200°C at 16 to 17 atmospheres pressure. An outer zone 20, still rather thin, is already crosslinked and has solidified and surrounds a zone 21 which has melted, but not yet crosslinked, while zone 22 underneath is not yet heated above melting point. Zone 22 in particular is still solid from the initial cooling with little or no crosslinks. The conductor core 1 is firmly embedded in zone 22 and is immediately surrounded by the surface finish coating 23. Reference numeral 24 denotes the bottom of tube 15. The thermosetting plastic of zone 20 permits sliding thereacross without damage.

Further down in station 13 (tube 15) the zones have shifted as shown in FIG. 3. The crosslinked skin 20 has grown significantly, to a depth of about half the thickness of the envelope. Zone 20 is also solidified and stabilizes the concentricity. The outside temperature (inside of tube 15, of course) as applied to the envelope at this point is about 280°C or more, and the pressure as applied is 16 to 20 atmospheres. The cable is above the water level 13a at that point. The melted zone 21 has grown also in thickness but migrated radially inwardly. The crosslinked skin or zone 20 decreases in crosslinking density in direction of the temperature gradient while zone 21 exhibits an increase in viscosity of its molten state.

The conductor weighs heavy on the envelope from the inside, but it is enveloped by the still existing crystaline layer 22 around the conductor 25, supporting it. It should be noted here, and the same is true in the case of plastic that does not form crosslinks, that the initial quenching in tanks 7 etc. established rapid cooling under poor texture predominantly in the outer zones. If the cooling is applied was very short, the inner zones will have solidified more gradually and satisfactory crosslinks and/or crystal structure will have been formed with gradual deterioration towards the outer zones. Hence, reheating and restructuring may not have to involve the entire envelope, so that in the illustrated case zone 22 in FIG. 3 may, therefore, not be melted again as its structure is already satisfactory while intermediate zone 21 is being improved.

The providing of a radiation shield for high or very high voltage cable can also be carried out immediately ahead of the warm treatment device 13. Reference numeral 19 denotes an extruder for providing a conductive outer coating as radiation shield if the cable is to be used, for example, for high voltages such as 110 kilo-volts or higher. This extrusion press is disposed right in front of the heat treatment station 13. This way, extruder 19 serves as a sealing device for the entrance of tube 14. Also in this case extruder 14 may provide a particularly stable fast crosslinking layer as shield. That in turn is also instrumental in the avoiding of surface damage to the cable. Only one of the extruders, 19 or 11, needed.

As stated, a caterpillar like pulley device 17 pulls the cooled cable 25 out of tube 15 and runs it to take up drum 18.

This particular production line permits for the first time production of cable with thick insulation envelope but in a horizontal production line, whereby particularly the insulation is provided as a single layer coating in spite of its thickness without displacement of the conductor core inside of the insulation.

The method of the invention as practiced upon operating the above described equipment has the particular advantage that immediately following extrusion of the envelope one can test it as to size (thickness) excentricity, wall thickness, voids, etc. For many plastics, the envelope is quite transparent at that point and can be illuminated to optical or visual detection of flow as early as possible. The extruder operation can readily be controlled on the basis of that inspection so as to minimize rejects.

In the case of the known tower construction, inspection when carried out at the bottom finds the envelope no longer transparent. Early detection of flaws is particularly important upon starting up, as it often takes quite a long time before satisfactory and stable operating conditions have been established, for producing the cable at proper dimensions, quality, etc.

It is also of importance that the equipment can be used for crosslinking as well as for other plastic envelopes. Controlled reheating and cooling results in pressure proof insulation envelopes which have adequate surface properties as well as high insulative strength with regard to high voltages. The production will be under control from the very beginning and any deviation from desired conditions is immediately amenable to remedy. It was found that reject cable is in fact minimized particularly if compared with known methods.

The invention was described with reference to polyethylene with or without formation of crosslinks. Other crosslinking - thermosetting but initially thermoplastics are polymerisates and copolymerisates of olefines and elastomeres.

Temperature and pressure for crosslinking are known parameters and it is important in each instance to establish a high radial temperature gradient on reheating under pressure so that a thermosetting plastic shell forms before the inner zones melt.

Other thermoplastics whose crystalinity can be improved by the invention are polymerisates and copolymerisates of olefines, e.g. polybutene, polypropylene.

In each instance, one should operate at least for a period of time in the reheating phase at a temperature between the melting points of high and low crystaline plastics to obtain crystal growth and outer shell solidification before the envelope has melted all the way through. The temperature gradient is low in these cases and actually may have to be flattened by internal reheating.

The invention is not limited to the embodiments described above but all changes and modifications thereof not constituting departures from the spirit and scope of the invention are intended to be included.

We claim:

1. Method of providing a relatively thick thermoplastic or elastomeric envelope on a conductor, comprising the steps of:
   extruding an envelope onto the conductor without counter pressure;
   cooling the envelope relatively fast immediately following the extrusion without surface contact of the envelope as between its being extruded and engagement with a cooling fluid, to obtain a stable, supporting sleeve as part of the envelope for maintaining a concentric disposition of the conductor in the envelope;
   reheating the envelope under pressure but for such short duration so that only a surface layer of the envelope melts and causing the envelope to solidify on the outside before the envelope has melted all the way through the conductor, to obtain a radially inwardly migrating melting zone followed by radially inwardly migrating resolidification, for a gradual formation of the desired internal texture in the resolidifying envelope; and
   said steps being carried out concurrently in a continuous process, on the passing-through conductor, affecting different portions of the enveloped conductor at different times and being carried out directly consecutively as regards the same conductor portion on which the envelope is formed.

2. Method as in claim 1, wherein the envelope to be made requires crosslinking, the reheating of the envelope raising its surface temperature of a temperature well above the melting point and wherein crosslinks are rapidly formed under pressure and heating, so that an outer shell of the envelope resolidifies prior to melting of innermost zones in the envelope.

3. Method as in claim 2, wherein the temperature is raised to exceed 200°C and a pressure between 16 to 20 atmospheres is applied.

4. Method as in claim 3, and including wetting the envelope prior to reheating by a crosslinking enhancing medium.

5. Method as in claim 4, the wetting being combined with the first cooling.

6. Method as in claim 4, using peroxide as wetting agent.

7. Method as in claim 1, wherein the cooling results in amorphous texture of the envelope, the reheating of the envelope raising its surface temperature above softening and being followed by cooling so that heating lasts only for a duration insufficient to cause the plastic to melt all the way through, the cooling resolidifying the outermost zones of the envelope to obtain crystallization therein, while a melting zone migrates inwardly, followed by gradual crystallization growth, from the outermost zone, during continued subsequent gradual cooling.

8. Method as in claim 1, wherein said fast cooling is carried out in steps.

9. Method as in claim 8, and extruding a weakly electrically conductive layer onto the envelope inbetween two of said steps of fast cooling, the latter layer including fast crosslinking plastic.

10. Method as in claim 1, wherein the envelope is preheated subsequently to first cooling step.

11. Method as in claim 10, wherein preheating occurs from the outside through radiation.

12. Method as in claim 10, wherein preheating occurs from the inside through electric heating.

13. Method as in claim 1, wherein the envelope is preheated to a temperature of 60° to 100°C prior to heating under pressure.

14. Method as in claim 1, wherein reheating is carried out in steam.

15. Method as in claim 14, wherein the final cooling is carried out by sequentially passing the envelope through warm and cold water.

16. Method as in claim 1, wherein the initial cooling involves free suspension of the conductor with extruded envelope, dipping into a cooling tank.

17. Method as in claim 1, wherein the reheating of the envelope is carried out under catenoidal free suspension of the conductor with envelope.

* * * * *